United States Patent Office 3,123,576
Patented Mar. 3, 1964

3,123,576
RARE EARTH SHIELD
Nathan Klein, Baltimore, Md., assignor to the United States of America as represented by the Secretary of the Army
No Drawing. Filed Oct. 5, 1962, Ser. No. 228,770
4 Claims. (Cl. 252—478)
(Granted under Title 35, U.S. Code (1952), sec. 266)

The invention described herein may be manufactured and used by or for the Government of the United States of America for governmental purposes without the payment to me of any royalty thereon.

This invention relates to a coating composition which has a high capacity for absorbing thermal neutron radiation.

My invention lies in the discovery that a paint composition incorporating an oxide of gadolinium, samarium, or europium when dried to a film of 3–7 mils over the surface of a military vehicle with heavy steel walls such as ships, tanks, armored personnel carriers and the like will effectively stop thermal neutron radiation from penetrating the interior.

In a similar manner concrete bunkers or fallout shelters can be painted with my compositions to render them more effective to stop the harmful effects of an atomic explosion. Therefore, I have provided a relatively inexpensive means to modify existing equipment by merely painting on it a film of my new composition and thus render the equipment more effective to protect the personnel therein.

It is known that iron, steel and similar dense materials such as concrete and the like absorb thermal neutrons to become radioactive and emit beta and gamma rays. This situation is intolerable in a tactical situation since military equipment and military vehicles in particular must be serviced and repaired constantly and such work would be rendered nearly impossible if the equipment was made "hot" by exposure to thermal neutrons.

The application of my new paint to such existing equipment effectively stops the thermal neutrons from penetrating into the dense base on to which it is applied. The compositions will provide almost insignificant fast neutron shielding. However, fast neutron induced radioactivity is relatively minor in comparison to the effect of thermal neutrons.

The invention provides a novel pigmented coating composition whose essential ingredients are finely ground gadolinium oxide, samarium oxide or europium oxide. Other pigments are used in conjunction with the above rare earth oxides such as basic lead sulfate, basic lead carbonate, and zinc oxide.

Conventional extenders are used in the composition such as silica, aluminum silicate, magnesium silicate, barium sulfate and the like.

Various tinting colors may be added to my composition to achieve the desired color such as olive drab or the usual camouflage pigments.

For the application to concrete surfaces, the rare earth oxides of my invention can be incorporated into a vehicle which is alkali resistant in a manner well known to the art.

Other suitable vehicles for my pigments include nitrocellulose lacquers, cellulose acetate lacquers, various synthetic resin coating compositions, natural resin compositions, and drying oils such as linseed oil, tung oil and the like.

A typical paint embodying my invention may be made in accordance with the following formula:

| | Lbs. |
|---|---|
| Basic lead carbonate | 1.69 |
| Basic lead sulfate | 1.38 |
| Zinc oxide | 2.57 |
| Gadolinium oxide | 1.23 |
| Magnesium silicate and tinting pigments to make | 2.73 |
| Raw linseed oil | 3.42 |
| Boiled linseed oil | 1.16 |
| Mineral spirits | .75 |
| Paint drier | .37 |

The above formulation makes a one gallon batch of the desired paint. Obviously, samarium oxide or europium oxide can be substituted in the formula for the gadolinium oxide with substantially the same desirable results.

My invention resides in the discovery that the above rare earth oxides when incorporated into a suitable vehicle will stop 99% of thermal neutron radiation. Obviously, other combinations of the non-essential ingredients may be used to produce a similar effect. Such variations are to be understood as falling within the scope of the following claims.

I claim:
1. A paint composition having a relatively high capacity for absorbing thermal neutron radiation consisting of:
   (a) a drying oil;
   (b) a mixture of pigment materials in which a minor proportion consists of a member of the group comprising gadolinium oxide, samarium oxide and europium oxide.
2. A paint composition as set forth in claim 1 in which the oxide is gadolinium oxide.
3. A paint composition as set forth in claim 1 in which the oxide is samarium oxide.
4. A paint composition as set forth in claim 1 in which the oxide is europium oxide.

References Cited in the file of this patent
UNITED STATES PATENTS

| 2,859,163 | Ploetz et al. | Nov. 4, 1958 |
| 2,961,415 | Axelrad | Nov. 22, 1960 |